Sept. 20, 1960 M. BURGER 2,953,074
FLASH IGNITION FOR CAMERAS
Filed May 17, 1956 2 Sheets-Sheet 1
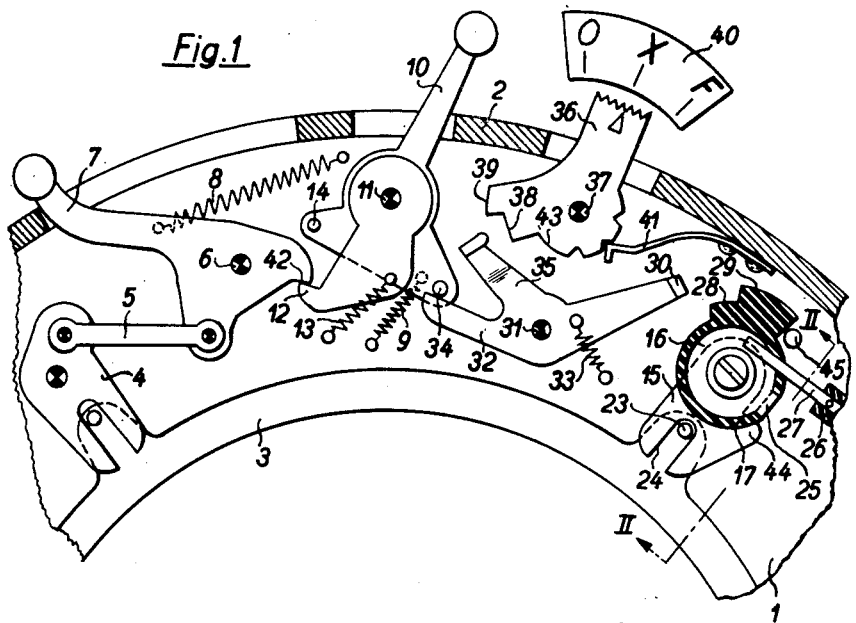
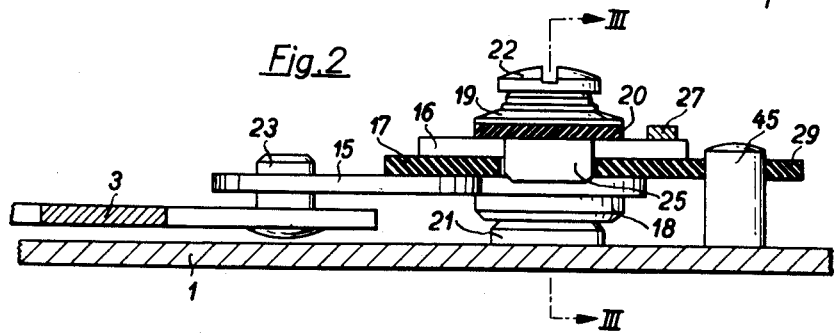
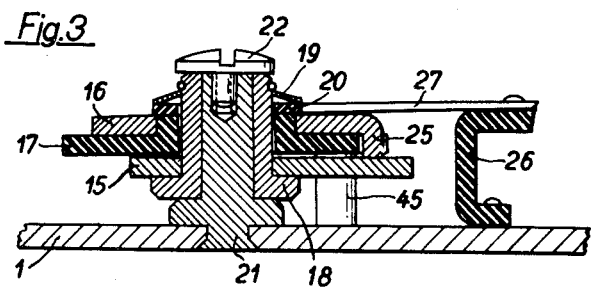
INVENTOR.
Michael BURGER
BY:
Michael S. Striker
agt.

Sept. 20, 1960   M. BURGER   2,953,074
FLASH IGNITION FOR CAMERAS
Filed May 17, 1956   2 Sheets-Sheet 2
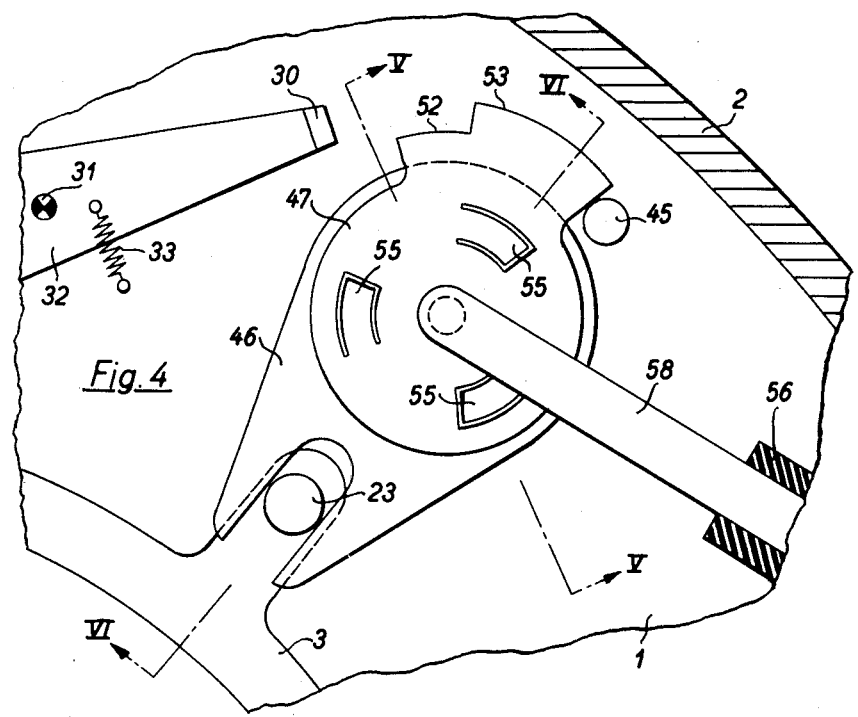
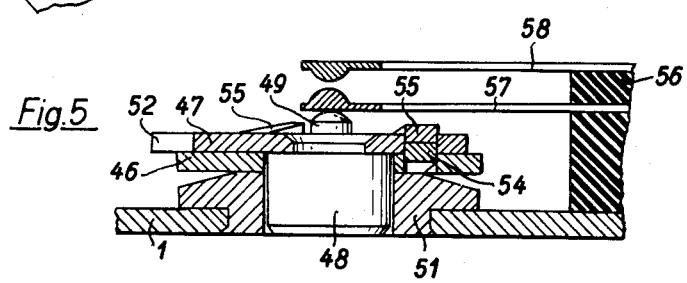
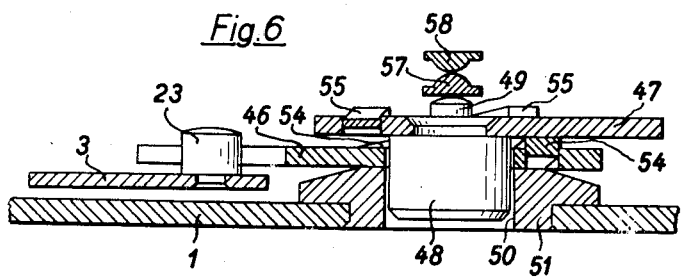
INVENTOR.
Michael BURGER
BY: Michael S. Striker
agt.

United States Patent Office 2,953,074
Patented Sept. 20, 1960

2,953,074

FLASH IGNITION FOR CAMERAS

Michael Bürger, Pognerstrasse 2, Munich 25, Germany

Filed May 17, 1956, Ser. No. 585,436

Claims priority, application Germany May 20, 1955

16 Claims. (Cl. 95—11.5)

The present invention relates to cameras.

More particularly, the present invention relates to flash igniting devices for use in cameras.

Flash igniting devices of this type which are already known have the disadvantage of being extremely complicated and furthermore where the shutter must be covered during cocking thereof great care must be taken to prevent igniting of the flash during the opening and closing of the shutter when it is cocked. Also, with the known flash igniting devices the individual parts thereof must be very carefully assembled with the shutter assembly and must be very carefully adjusted in order to provide a faultless operation with the desired synchronization. Furthermore, the known igniting devices take up an extremely large amount of the very small space which is available for such devices in shutter assemblies.

One of the objects of the present invention is to provide a flash igniting device which is of an extremely simple construction and composed for the most part of simple stamped elements which in spite of their simple and inexpensive manufacture provide a perfect igniting of the flash as well as synchronizing thereof.

Another object of the present invention is to provide a flash igniting device which forms an extremely compact unit which requires but a small amount of space and which may be very quickly and easily assembled with or disassembled from the shutter assembly.

A further object of the present invention is to provide a flash igniting device whose elements are constructed in such a simple manner that no particular adjusting of the device is required.

An additional object of the present invention is to provide a flash igniting device of extremely small mass so that it operates perfectly even at very high shutter speeds and so that the movement of the parts of the flash igniting device have practically no influence on the operation of the shutter itself.

Still another object of the present invention is to provide a flash igniting device which reliably prevents ignition of the flash when the shutter is cocked even if the shutter is of the type which opens and closes during cocking and therefore requires a cover for covering the shutter during cocking thereof.

A still further object of the present invention is to provide a flash igniting device which requires no particular levers or the like for the purpose of placing the device out of operation.

Also, the objects of the present invention include a flash igniting device which can operate without undesirable vibrations even during very high shutter speeds.

Furthermore, it is an object of the present invention to provide a flash igniting device whose components are capable of cleaning themselves during their movement.

With the above objects in view, the present invention mainly consists of a camera which has a flash igniting device which includes a pair of circuit controlling elements which have with respect to each other a rest position where an electrical circuit controlled by the circuit controlling elements is open and an operating position where this circuit is closed. An engaging means engages the circuit controlling elements to prevent movement thereof with respect to each other until one of these elements is restrained from movement while the other of these elements continues to move. A guide means cooperates with the circuit controlling elements for guiding the same for movement together in the same direction, and a moving means operatively engages the element which is not restrained for movement to move the latter together with the element which is restrained in the same direction. A stop means has a position located in the path of movement of the element whtich is to be restrained for engaging and stopping the latter from moving together with the unrestrained circuit controlling element so that the moving means continues to move the latter element so as to shift the circuit controlling elements between their rest and operating positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary, elevational, partly sectional view of a flash igniting device according to the present invention shown together with shutter operating structure which is associated with the flash igniting device;

Fig. 2 is a sectional elevational view on an enlarged scale taken along line II—II of Fig. 1 in the direction of the arrows;

Fig. 3 is a sectional elevational view of the structure of Fig. 2 taken along line III—III of Fig. 2 in the direction of the arrows;

Fig. 4 is a fragmentary, partly sectional elevational view of another embodiment of a flash igniting device according to the present invention;

Fig. 5 is a sectional elevational view taken along line V—V of Fig. 4 in the direction of the arrows; and Fig. 6 is a fragmentary sectional elevational view taken along line VI—VI of Fig. 4 in the direction of the arrows.

Referring now to the drawings and to Figs. 1–3 in particular, it will be seen that the shutter assembly illustrated includes an annular wall 1 located in a plane normal to the optical axis of the camera. A cylindrical wall 2 is connected to the wall 1 and forms with the latter part of the housing of the shutter assembly.

Within the shutter assembly is located a ring 3 which is connected in a known way to the leaves of the shutter for turning these leaves so as to open and close the shutter. A bell crank 4 is pivotally carried by the wall 1 and is formed with a slot into which a pin affixed to the ring 3 extends, so that the bell crank 4 is connected to the ring 3 by this pin and slot connection which is shown at the lower left portion of Fig. 1. A link 5 is pivotally connected at its left end, as viewed in Fig. 1, to the bell crank 4 and at its right end to a shutter cocking lever 7 which is pivotally carried by the wall 1 at 6. A spring 8 is connected at one end to the lever 7 and at its opposite end to a pin connected to the wall 1, so that this spring 8 in the position of the parts shown in Fig. 1 urges the lever 7 to turn in a clockwise direction about the pivot pin 6. The wall 2 is formed with a slot through which the lever 7 extends so that its outer end may be engaged by the operator, and this slot is long enough to provide the desired extent of turning movement of the lever 7.

A spring 9 is connected at one end to a pin fixed to the wall 1 and at its opposite end to a pin affixed to a shutter release lever 10 which is pivotally connected to the wall 1 at 11, so that the spring 9 urges the lever 10 to turn in a clockwise direction about the pin 11, as viewed in Fig. 1. This pin 11 also pivotally supports a plate 12 which has at its lower left portion, as viewed in Fig. 1, a projection engaging a projection 42 of the lever 7. A spring 13 is connected at one end to a pin fixed to the wall 1 and at its opposite end to a pin fixed to the plate 12 so as to urge the latter to turn in a clockwise direction about the pivot pin 11, as viewed in Fig. 1. The lever 10 carries a pin 14 which engages the plate 12 during turning of the lever 10 against the force of spring 9 in a counterclockwise direction, as viewed in Fig. 1, for a purpose described below.

The flash igniting device of the present invention includes a pair of circuit controlling elements 15 and 16 which control the opening and closing of an electrical circuit of the flash device, these elements 15 and 16 being shown at the right part of Fig. 1 and being illustrated on an enlarged scale in Figs. 2 and 3. The elements 15 and 16 are in the form of substantially flat plates which may be easily and inexpensively stamped. An insulating plate 17 is located between the circuit controlling elements 15 and 16 to insulate the same from each other, and furthermore this insulating plate 17 acts as a friction clutch in the form of an engaging means which engages the elements 15 and 16 to cause the same to move together until the element 16 is restrained from movement while the element 15 continues to move, as will be apparent from the description which follows. As is particularly apparent from Fig. 3, the elements 15—17 are turnable on a sleeve 18 having an outwardly extending bottom flange on which the lower circuit controlling element 15 rests. As is apparent from Fig. 3, the insulating plate 17 has an upwardly extending tubular portion which is surrounded by the circuit controlling element 16. A washer 20 of electrical insulating material engages the top face of member 17 and circuit controlling element 16, and an annular dished spring 19 engages at its outer periphery the washer 20 and at its inner periphery a snap ring which is located in a groove of the sleeve 18, so that the spring 19 acts as a spring means which urges the circuit controlling elements 15 and 16 toward each other and into engagement with the insulating plate 17.

It will be noted that the elements 15—20 form a subassembly which may be separately manufactured and assembled and which may be very quickly and easily assembled with and removed from the entire shutter assembly. Thus, as is apparent from Fig. 3, with the circuit controlling elements 15 and 16 as well as the insulating plate 17 and the washer 20 and spring 19 joined to the sleeve 18, this sleeve may be placed on a pin 21 which is fixed to the wall 1, as indicated in Fig. 3, and after the sleeve 18 with the parts carried thereby is thus very quickly and easily placed on the pin 21, the screw member 22 is threaded into a threaded bore of the pin 21 and engages with its head end the top face of the sleeve 18, as viewed in Fig. 3, so that in this way the entire assembly composed of elements 15—20 is placed in its operating position. The pressure of the screw 22 maintains the sleeve 18 stationary while elements 15—17 are turnable about the sleeve 18.

The shutter ring 3 carries a pin 23 which extends into a slot 24 formed in the plate 15, so that through this pin and slot connection the circuit controlling element 15 is connected to the ring 3 to be moved thereby, this ring 3 thus forming through the pin and slot connection 23, 24 a moving means for moving the circuit controlling element 15.

The insulating plate 17 is formed at its periphery with a cutout through which extends a lug 25 formed integrally with and bent downwardly from the circuit controlling element 16, this lug 25 having a bottom face which is located slightly below the top face of the plate 15, in the position of the parts which is illustrated in Fig. 2. Because element 16 and plate 17 are connected together by lug 25 for movement together at all times they cooperate to form a single operative element, and in the claims below readable upon the embodiment of Figs. 1-3 reference to a circuit-controlling element which is restrained against continued movement after it has started to move designates the single operative element 16, 17. Furthermore, it will be noted that the lower left corner of the lug 25, as viewed in Fig. 2, is rounded, so that the plate 15 can smoothly move beneath the lug 25 while engaging the latter in a manner described below.

An electrical insulating member 26 is fixedly carried by the wall 1 and in turn fixedly carries an elongated electrically conductive leaf spring 27 which forms part of the unillustrated electrical circuit of the flash device and which has its left free end, as viewed in Fig. 3, in engagement with the top face of the circuit controlling element 16. Thus, the spring 27, in addition to the spring 19, urges the circuit controlling element 16 downwardly toward the circuit controlling element 15 and thus also promotes transfer of the movement of the element 15 to the element 16 through the insulating plate 17 which acts as a friction clutch. The plate 15 is grounded while the plate 16 is connected into the electrical circuit of the flash igniting device through the electrically conductive leaf spring 27. Thus, when the lug 25 engages the plate 15 the circuit of the flash igniting device is closed.

As is particularly apparent from Fig. 1, the electrical insulating plate 17 has a pair of projections 28 and 29, and the projection 29 extends to a greater radial distance from the center of the plate 17 than the projection 28. These projections 28 and 29 are adapted to cooperate with an upwardly extending end portion 30 of a lever 32, this end portion 30 extending upwardly, as viewed in Fig. 1. The lever 32 is pivotally carried by the wall 1 through the medium of the pivot pin 31, and a spring 33 is connected at one end to a pin fixed to the wall 1 and at its opposite end to a pin fixed to the lever 32, so that the spring 33 urges the lever 32 in a clockwise direction about the pivot pin 31, as viewed in Fig. 1. The lower left end of the lever 32, as viewed in Fig. 1, engages a pin 34 which is fixed to the shutter release lever 10, and the lever 32 includes an arm 35 having a free end located adjacent and directed toward a lever 36 which adjusts the synchronizing of the flash. This lever 36 is pivotally carried by the wall 1 on a pivot pin 37 affixed to the wall 1, and the lever 36 extends through a slot formed in the wall 2 to the exterior of the shutter housing where the lever 36 may be actuated by the operator so as to be placed in position with the indicia O, X, F shown in Fig. 1 as located on a plate 40 which is fixed to the outer face of the camera housing. The lever 36 has projections 38 and 39 adapted to cooperate with the arm 35 for limiting the turning movement of the lever 32 under the influence of the spring 33 in accordance with the angular position of the lever 36. A leaf spring 41 is fixed at its right end, as viewed in Fig. 1, to the inner face of the wall 2 of the shutter housing and with its left free end extends into one of a plurality of V-notches formed in the periphery of the lever 36 so as to reliably locate the latter in one of its plurality of adjusted positions. It will be noted that in addition to the projections 38 and 39, the lever 36 has an arcuate edge portion 43 which is adapted to cooperate with the lever 32 in a manner described below.

As is apparent from Fig. 1, the circuit controlling element 15 has a projection 44 located at the same radial distance from the axis of sleeve 18 as the lug 25. Also, a stop pin 45 is fixed to the wall 1 and located in the path of movement of the projection 29 of the insulating plate 17.

The above described structure operates as follows:

The parts are shown in the position which they take when the shutter is cocked. In order to release the shutter, the operator turns the shutter release lever 10 in a counterclockwise direction, as viewed in Fig. 1, against the influence of the spring 9. The turning of the lever 10 in this direction causes the pin 14 to approach the plate 12 and to engage the latter and thus move the plate 12 against the force of spring 13 in a counterclockwise direction about the pin 11, so that the projection of the plate 12 moves out of engagement with the projection 42 of the shutter cocking lever 7, and the cocking lever 7 is now freed to the influence of the spring 8. The cocking lever 7 as well as the shutter are retained in their cocked position against the force of spring 8 by engagement of the projection 42 of lever 7 with the plate 12, in the position of the parts shown in Fig. 1.

When the shutter is thus released, the spring 8 pulls the lever 7 in a clockwise direction about the pin 6, as viewed in Fig. 1, so that the link 5 moves to the left, as viewed in Fig. 1, so as to turn the bell crank 4 in a counterclockwise direction and thus turn the shutter operating ring 3 in a clockwise direction, as viewed in Fig. 1. During turning of the ring 3 in this direction the shutter is moved from its closed to its open position. When the lever 7 has turned to such an extent that the link 5 is at the end of its movement to the left, as viewed in Fig. 1, the shutter is fully open, and now the continued turning of the cocking lever 7 in a clockwise direction under the action of the spring 8 pulls the link 5 to the right, as viewed in Fig. 1, so as to turn the bell crank 4 in a clockwise direction and thus turn the shutter operating ring 3 in a counterclockwise direction which closes the shutter, and when the lever 7 is at its right end position, as viewed in Fig. 1, where it engages the opposite end of the slot of wall 2 through which it extends, the shutter is again closed, the ring 3 and bell crank 4 are again in the position of Fig. 1, and the right end of the link 5 is now located above the pivot pin 6 rather than below the same, as viewed in Fig. 1. A shutter operating arrangement similar to that described is disclosed in U.S. Patent 2,172,295. Thus, during the opening and closing of the shutter which takes place during the clockwise turning of the shutter cocking lever 7, the pin 23 fixed to the ring 3 turns with the latter first in a clockwise and then in a counterclockwise direction, as viewed in Fig. 1, and as a result during this operation of the shutter the circuit controlling element 15 turns first in a counterclockwise direction and then in a clockwise direction about the sleeve 18, as viewed in Fig. 1. The insulating member 17 through its frictional engagement with the circuit controlling elements 15 and 16 transfers the movement of the element 15 to the element 16, and thus the element 16 turns with the element 15 first in a counterclockwise direction and then in a clockwise direction, as viewed in Fig. 1.

In the position of the parts shown in Fig. 1 the lever 36 is set at the position X. In this position of the lever 36 the projection 38 thereof is located in the path of movement of the free end of the arm 35 of the lever 32. As the shutter release lever 10 is turned to release the shutter, the spring 33 turns the lever 32 in a clockwise direction, as viewed in Fig. 1, while maintaining the lever 32 in engagement with the pin 34 of the turning lever 10, and the lever 32 continues to turn in this manner until the free end of its arm 35 engages the projection 38 of the lever 36, so that this lever 36 determines the position to which the lever 32 is turned by the spring 33 when the shutter release lever 10 is actuated. When the arm 35 engages the projection 38 of the lever 36, the free end 30 of the lever 32 is located in the path of turning movement of the projection 29 of the insulating plate 17. Thus, while the shutter operating ring 3 turns in a clockwise direction, as viewed in Fig. 1, to open the shutter the elements 15—17 turn in a counterclockwise direction until the projection 29 of the insulating plate 17 engages the end 30 of the lever 32. The parts are so designed that projection 29 engages part 30 of lever 32 at a very short time before the moment when the shutter is fully open. After the projection 29 engages the end 30 of lever 32, the ring 3 continues to turn in a clockwise direction, as viewed in Fig. 1, to move the shutter to its fully open position, and as a result the circuit controlling element 15 continues to turn in a counterclockwise direction while the insulating plate 17 remains stationary because of the engagement of projection 29 thereof with lever 32. Because the lug 25 of circuit controlling element 16 extends downwardly through the peripheral cutout of plate 17, this element 16 cannot move with respect to the element 17, and therefore at this time the projection 44 of the element 15 approaches and very shortly engages the lug 25 in order to complete the circuit through the flash apparatus. Because of the lower left rounded corner of the lug 25, as viewed in Fig. 2, the projection 44 moves beneath the lug 25 while rubbing against the latter, and inasmuch as the bottom face of the lug 25 is located slightly below the top face of the element 15, this lug 25 is raised so as to tilt the element 16 together with the element 17 in the manner shown in Fig. 3. In this way a very good electrical contact is provided between lug 25 and the circuit controlling element 15.

After the shutter is fully opened, the link 5 starts to move to the right, as viewed in Fig. 1, during the continued turning of lever 7 in a clockwise direction, as viewed in Fig. 1, so that the ring 3 now turns in a counterclockwise direction, as viewed in Fig. 1, to close the shutter, and the pin 23 which turns with the ring 3 causes the circuit controlling element 15 to turn in a clockwise direction, as viewed in Fig. 1, so that this turning of the element 15 is transferred through the plate 17 to the element 16, and thus elements 15—17 turn together in a clockwise direction during the closing of the shutter. The parts continue to turn in this direction until the projection 29 engages the stop pin 45. At this time elements 16 and 17 can no longer turn together with the element 15, and the latter element continues to turn in a clockwise direction, as viewed in Fig. 1, until the ring 3 again has the position of Fig. 1 where the shutter is closed, and at this time the circuit controlling element 15 has turned to the position shown in Fig. 1 where the projection 44 has moved out of contact with the lug 25 so that the circuit is now open.

If with the flash apparatus a flash bulb having a delayed reaction is used, this delayed reaction requiring ignition for a certain time period before the flash bulb reaches its brightest illumination, then it is desirable to complete the circuit at a certain time before the shutter is fully open, and at a greater time before the shutter is fully open than is provided with the setting X, and for this purpose the lever 36 is set on the letter F of the scale 40. When the lever 36 is thus set at F, then the edge portion 43 of the lever 36 is located in the path of movement of the free end of the arm 35 of the lever 32, and as a result when the shutter release lever 10 is actuated to release the shutter the end 30 of the lever 32 becomes located in the path of movement of the projection 28 which causes the elements 16 and 17 to stop turning in a counterclockwise direction with the element 15 at a time before these elements stop turning when the lever 36 is at the setting shown in Fig. 1. Thus, with the setting of the lever 36 at F, the projection 44 of circuit controlling element 15 will engage the lug 25 at a greater period of time before the shutter is fully open than with the lever 36 set at X. Except for this difference the structure operates in the same way.

If it is desired to operate the camera without using the flash apparatus, then the lever 36 is set at O, and this causes the projection 39 to be located in the path of movement of the free end of the arm 35 of the lever 32. With the parts in this position the end 30 of the lever 32 is not located in the path of movement of the projections 29 or 28, and thus at this time there is no restraint of the movement of elements 16 and 17, and thus the circuit to the flash apparatus is not closed when the lever 36 is set in this position. It will be noted that with this arrangement it is possible to set the flash apparatus out of operation without using any special levers for this purpose, and furthermore the lug 25 does not engage the circuit controlling element 15 so that there is no unnecessary wear of the parts. On the other hand, the circuit controlling element 16 continues to turn with respect to the electrically conductive leaf spring 27, so that the contact between elements 16 and 27 is maintained clean.

Assuming now that the shutter has been released and that it is desired to cock the shutter again, the cocking lever 7 is turned in a counterclockwise direction, as viewed in Fig. 1, back to the position shown in Fig. 1. During such turning of the lever 7 the spring 8 is tensioned, and during the first part of this counterclockwise turning of the lever 7, the link 5 moves to the left, as viewed in Fig. 1, so as to turn the shutter operating ring 3 in a clockwise direction which causes the shutter to open, and during the continued turning of the lever 7 the link 5, after it reaches the end of its movement to the left, as viewed in Fig. 1, moves to the right back to the position shown in Fig. 1 which causes the shutter operating ring 3 to turn in a counterclockwise direction which again closes the shutter. Because the shutter is opened and closed during cocking of the shutter, it is necessary to provide a device which covers the shutter to prevent exposure during cocking of the shutter. This device can be of conventional construction and forms no part of the present invention. Such a device for covering the shutter during cocking thereof is disclosed in British Patent 723,-291 and in German Patent 894,957. Also, the invention is fully applicable to shutter arrangements where the ring 3 does not turn during cocking of the shutter so that a device for covering the shutter during cocking thereof is not required. A shutter arrangement of this type is shown in the above mentioned U.S. Patent 2,172,295.

During this cocking of the shutter, the elements 15—17 of course turn together with the shutter operating ring 3. However, at this time the lever 32 remains in the position shown in Fig. 1, because the shutter release lever 10 is not actuated and also remains in the position shown in Fig. 1, so that the end 30 of the lever 32 remains in the position shown in Fig. 1 where it is not located in the path of movement of any part of the element 17. In this way, during cocking of the shutter the lug 25 never engages the projection 44 and the circuit does not close. Thus, there is absolutely no possibility of accidental closing of the circuit to the flash during cocking of the shutter.

While the lever 7 is turned so as to cock the shutter, it engages the plate 12 and turns the latter in a counter-clockwise direction about the pin 11, as viewed in Fig. 1, against the action of the spring 13, until the projection 42 of the lever 7 becomes located in the position shown in Fig. 1, at which time the plate 12 suddenly turns in a clockwise direction under the action of spring 13 to engage the lever 7 at the projection 42 thereof, in the manner shown in Fig. 1, which thus releasably retains the shutter in its cocked condition.

In Figs. 4–6 there is shown another embodiment of a flash igniting device according to the present invention, and the remaining parts of the shutter assembly which are not illustrated in Figs. 4–6 are identical with the parts illustrated in Fig. 1. Referring to Figs. 4–6, the embodiment of the invention illustrated therein includes a circuit controlling element 46 which is located beneath and in engagement with a second circuit controlling element 47. The circuit controlling elements 46 and 47 may be conveniently stamped from flat sheet metal, so that these parts may be manufactured as conveniently and inexpensively as the parts of the flash igniting device of the embodiment of Figs. 1–3.

The circuit controlling element 47 is affixed to a pin 48 which is provided at its top end with a projection 49 extending upwardly from the plane of the upper circuit controlling element 47, as viewed in Figs. 5 and 6. The pin 48 is turnably guided for movement about its axis in the opening 50 of a sleeve 51 which is fixed to the wall 1 of the housing of the shutter assembly. The circuit controlling element 47 is provided with projections 52 and 53 which are identical with the projections 28 and 29 of the element 17 described above and which cooperate in exactly the same way with the end 30 of lever 32 as well as with the stop pin 45.

The lower circuit controlling element 46 has a plurality of tongues 54 struck therefrom and extending upwardly from the top face of the circuit controlling element 46. The circuit controlling element 47 has a set of identical tongues 55 struck therefrom, and in the position of the parts shown in Figs. 4 and 5, the lower tongues 54 of the element 46 extend into the cutouts of the element 47 formed by the tongues 55 thereof, as is evident particularly from Fig. 5. It is evident that with this arrangement the circuit controlling elements 46 and 47 will turn together in a counterclockwise direction, as viewed in Fig. 4, until the element 47 is restrained against further movement by the lever 32, and at this time the element 46 can continue to turn with respect to the element 47, so that tongues 54 cooperate with element 47 to form a friction clutch means. Such turning of element 46 with respect to element 47 causes the projections 54 to move out of the recesses of element 47 and as a result this element 47 is moved upwardly, as viewed in Figs. 5 and 6, in a direction normal to its plane, the pin 48 moving upwardly with the element 47 from the position of Fig. 5 to that of Fig. 6. It will be noted that the element 46 is formed with a slot identical with the slot 24 of element 15 and that the pin 23 of the shutter operating ring 3 extends into this slot, so that the circuit controlling element 46 is moved in exactly the same way as the circuit controlling element 15.

In the embodiment of Figs. 4–6, the wall 1 carries an insulating block 56 which in turn has a pair of contacts 57 and 58 affixed thereto, these contacts being in the form of springy leaf springs. The springy contact 57 engages the projection 49 of the pin 48 so as to urge the circuit controlling element 47 downwardly into engagement with the circuit controlling element 46. As is apparent from Figs. 5 and 6, this springy contact 57 is located between element 47 and the contact 58. Thus, when the circuit controlling element 47 is restrained from turning in a counterclockwise direction, as viewed in Fig. 4, with the circuit controlling element 46, the continued turning of the latter moves the element 47 in a direction normal to its plane toward the contact 58, and thus the parts move from the position of Fig. 5 to that of Fig. 6, and it is evident that the upward movement of the projection 49 moves the contact 57 into engagement with the contact 58 so as to close the circuit to the flash apparatus. During the return movement of the parts to the position of Fig. 4, the element 47 turns with the element 46 until the projection 53 engages the stop pin 45, at which time the element 46 continues to turn in a clockwise direction, as viewed in Fig. 4, so that the projections 54 again enter the recesses of the element 47, and thus the spring 57 can move the circuit controlling element 47 downwardly and the circuit is opened in this manner.

Instead of being provided with tongues 54, the circuit controlling element 46 can simply have wedge-shaped projections fixed thereto, and in fact the projections 54 form substantially wedge-shaped projections at the top face of the circuit controlling element 46. Also, instead of having recesses formed by the tongues 55, the circuit controlling element 47 may be formed with simple openings to receive such wedge-shaped projections.

Furthermore, instead of providing a pair of circuit controlling elements which are turnable together in the same direction about a common axis until one of these elements is restrained from movement, it is possible to provide an arrangement where the pair of circuit controlling elements are shiftable along a straight line, for example, together in the same direction until one of the elements is restrained from movement so that the other element then continues to move to close the circuit.

With the above described X setting of the lever 36 ignition will take place substantially simultaneously with the arrival of the shutter at its fully open position, while with the setting of the lever 36 at F of the scale 40, the circuit will be closed approximately 2–5 milliseconds before the shutter is fully open. It is also possible, without any difficulty, to provide an M setting where the circuit is closed approximately 20 milliseconds before the shutter is fully opened, and a setting of this latter type as well as the other settings described above are shown in U.S. Patent 2,596,671. Thus, such an M setting may be desirable when the movement of the shutter to its fully open position is retarded by a device which is moved by the lever 36 into the shutter mechanism or when the shutter operating ring 3 has a relatively long period of operation. Under certain circumstances, the lever 36 and the plates 17 or 47 may be provided with additional projections which cooperate with the lever 32 to accomplish the same results.

It will be understood that each of the elements described above, or two or more together, may also find a useful application in other types of cameras differing from the types described above.

While the invention has been illustrated and described as embodied in flash igniting devices for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move; guide means cooperating with said elements for guiding the same for movement together in the same direction; shutter means operatively engaging said other element for moving the latter and said one element therewith in the same direction; power means operatively connected with said shutter means for actuating the latter; and stop means having a position in the path of movement of said one element for engaging and stopping the movement thereof with said other element, said shutter means then continuing to move said other element in said direction to shift said elements between said rest and operating positions thereof.

2. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move; guide means cooperating with said elements for guiding the same for movement together in the same direction; shutter means operatively engaging said other element for moving the latter and said one element therewith in the same direction, said shutter means including and deriving its motion from a component of a shutter assembly of the camera which moves during operation of the shutter assembly; power means operatively connected with said shutter means for actuating the latter; and stop means having a position in the path of movement of said one element for engaging and stopping the movement thereof with said other element, said shutter means then continuing to move said other element in said direction to shift said elements between said rest and operating positions thereof.

3. For use in a camera, a flash igniting device comprising, in combination, a pair of circuit controlling elements having with respect to each other a rest position where an electrical circuit controlled by said elements is open and an operating position where the circuit is closed; friction clutch means engaging said elements to prevent movement thereof with respect to each other until one of said elements is restrained from movement while the other of said elements continues to move, said friction clutch means transferring the movement of said other element to said one element; guide means cooperating with said elements for guiding the same for movement together in the same direction; shutter means operatively engaging said other element for moving the latter and said one element therewith in the same direction; power means operatively connected with said shutter means for actuating the latter; and stop means having a position in the path of movement of said one element for engaging and stopping the movement thereof with said other element, said shutter means then continuing to move said other element in said direction to shift said elements between said rest and operating positions thereof.

4. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move; guide means cooperating with said elements for guiding the same for movement together in the same direction; shutter means operatively engaging said other element for moving the latter and said one element therewith in the same direction; stop means having a position in the path of movement of said one element for engaging and stopping the movement thereof with said other element, said shutter means then continuing to move said other element in said direction to shift said elements between said rest and operating positions thereof; and spring means cooperating with said elements for urging the same toward each other.

5. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move; guide means cooperating with said elements for guiding the same for movement together in the same direction; moving means operatively engaging said other element for moving the latter and said one element therewith in the same direction; and adjustable stop means having a plurality of different positions in the path of movement of said one element for engaging and stopping the movement thereof with said other element at a predetermined instant depending upon the position of said stop means, so that said moving means then continues to move said other element to shift said elements between said rest and operating positions thereof.

6. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move; guide means cooperating with said elements for guiding the same for movement together in the same direction; moving means operatively engaging said other element for moving the latter and said one element therewith in the same direction; and adjustable stop means having a plurality of different positions in the path of movement of said one element for engaging and stopping the movement thereof with said other element at a predetermined instant depending upon the position of said stop means, so that said moving means then continues to move said other element to shift said elements between said rest and operating positions thereof, said one element having a plurality of projections and said stop means being in the form of an adjustable lever which in said plurality of different positions of said stop means is respectively located in the paths of movement of said projections of said one element.

7. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move; guide means cooperating with said elements for guiding the same for movement together in the said direction; moving means operatively engaging said other element for moving the latter and said one element therewith in the same direction; adjustable stop means having a plurality of different positions in the path of movement of said one element for engaging and stopping the movement thereof with said other element at a predetermined instant depending upon the position of said stop means, so that said moving means then continues to move said other element to shift said elements between said rest and operating positions thereof, said one element having a plurality of projections and said stop means being in the form of an adjustable lever which in said plurality of different positions of said stop means is respectively located in the paths of movement of said projections of said one element; an adjusting member having a plurality of projections respectively located in the path of movement of said lever depending upon the position in which said adjusting member is set by the operator, said lever being spring urged toward but held from said adjusting member; and shutter release means engaging said lever for freeing the same for movement into engagement with one of said projections of said adjusting member when said shutter release means is actuated, so that said lever will become located in one of said different positions of said stop means when said shutter release means is actuated.

8. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move; guide means cooperating with said elements for guiding the same for turning movement together about a common axis in the same direction; shutter means operatively engaging said other element for moving the latter and said one element therewith in the same direction; and stop means having a position in the path of movement of said one element for engaging and stopping the movement thereof with said other element, said shutter means then continuing to move said other element in said direction to shift said elements between said rest and operating positions thereof.

9. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move, said elements being electrically conductive and being insulated from each other and said one element having a lug located in the path along which said other element continues to move to engage said other element when said elements are in said operating position thereof; guide means cooperating with said elements for guiding the same for movement together in the same direction; moving means operatively engaging said other element for moving the latter and said one element therewith in the same direction; and stop means having a position in the path of movement of said one element for engaging and stopping movement thereof with said other element so that said moving means then continues to move said other element to shift said elements between said rest and operating positions thereof.

10. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move, said elements being electrically conductive and being insulated from each other and said one element having a lug located in the path along which said other element continues to move to engage said other element when said elements are in said operating position thereof; guide means cooperating with said elements for guiding the same for movement together in the same direction; moving means operatively engaging said other element for moving the latter and said one element therewith in the same direction; stop means having a position in the path of movement of said one element for engaging and stopping the movement thereof with said other element so that said moving means then continues to move said other element to shift said elements betweeen said rest and operating positions thereof; and an electrically conductive leaf spring forming part of the circuit and engaging only one of said circuit controlling elements during movement thereof.

11. For use in a camera, a flash igniting device comprising, in combination, a pair of circuit controlling elements having with respect to each other a rest position where an electrical circuit controlled by said elements is open and an operating position where the circuit is closed; engaging means engaging said elements to prevent movement thereof with respect to each other until one of said elements is restrained from movement while the other of said elements continues to move, said elements being electrically conductive and being insulated from each other and said one element having a lug located in the path along which said other element continues to move to engage said other element when said elements are in said operating position thereof; guide means cooperating with said elements for guiding the same for movement together in the same direction; moving means operatively engaging said other element for moving the latter and said one element therewith in the same direction; stop means having a position in the path of movement of said one element for engaging and stopping the movement thereof with said other element so that said moving means then continues to move said other element to shift said elements between said rest and operating positions thereof; and spring means urging said circuit controlling elements toward each other, said latter elements and said spring means together forming a subassembly of the flash igniting device.

12. For use in a camera, a flash igniting device comprising, in combination, a pair of circuit controlling elements having with respect to each other a rest position where an electrical circuit controlled by said elements is open and an operating position where the circuit is closed, said circuit controlling elements being in the form of substantially flat plates; engaging means engaging said elements to prevent movement thereof with respect to each other until one of said elements is restrained from movement while the other of said elements continues to move; guide means cooperating with said elements for guiding the same for movement together in the same direction and for guiding one of said elements for movement in a direction normal to its plane when said one element is restrained from movement and said other element continues to move; shutter means operatively engaging said other element for moving the latter and said one element therewith in the same direction; and stop means having a position in the path of movement of said one element for engaging and stopping the movement thereof with said other element, said shutter means then continuing to move said other element in said direction to shift said elements between said rest and operating positions thereof.

13. For use in a camera, a flash igniting device comprising, in combination, a pair of circuit controlling elements having with respect to each other a rest position where an electrical circuit controlled by said elements is open and an operating position where the circuit is closed, said elements being in the form of substantially flat plates and one of said elements being formed with a plurality of cutouts, the other of said elements having a plurality of substantially wedge-shaped projections respectively located in said cutouts of said one element when said elements are in their rest position and located out of said cutouts when said elements are in their operating position; engaging means engaging said elements to prevent movement thereof with respect to each other until said one of said elements is restrained from movement while said other element continues to move; guide means cooperating with said elements for guiding the same for planar movement together in the same direction and for guiding said one element for movement in a direction normal to its plane when said projections of said other element move into or out of said cutouts; moving means operatively engaging said other element for moving the latter and said one element therewith in the same direction; and stop means having a position in the path of movement of said one element for engaging and stopping the movement thereof with said other element so that said moving means then continues to move said other element to shift said elements between said rest and operating positions thereof.

14. For use in a camera, a flash igniting device comprising, in combination, a pair of circuit controlling elements having with respect to each other a rest position where an electrical circuit controlled by said elements is open and an operating position where the circuit is closed, said elements being in the form of substantially flat plates and one of said elements being formed with a plurality of cutouts, the other of said elements having a plurality of substantially wedge-shaped projections respectively located in said cutouts of said one element when said elements are in their rest position and located out of said cutouts when said elements are in their operating position, said cutouts of said one element being formed by tongues struck therefrom and said projections of said other element also being formed by tongues struck therefrom; engaging means engaging said elements to prevent movement thereof with respect to each other until said one of said elements is restrained from movement while said other element continues to move; guide means cooperating with said elements for guiding the same for planar movement together in the same direction and for guiding said one element for movement in a direction normal to its plane when said projections of said other elements move into or out of said cutouts; moving means operatively engaging said other element for moving the latter and said one element therewith in the same direction; and stop means having a position in the path of movement of said one element for engaging and stopping the movement thereof with said other element so that said moving means then continues to move said other element to shift said elements between said rest and operating positions thereof.

15. For use in a camera, a flash igniting device comprising, in combination, a pair of circuit controlling elements having with respect to each other a rest position where an electrical circuit controlled by said elements is open and an operating position where the circuit is closed, said elements being in the form of substantially flat plates and one of said elements being formed with a plurality of cutouts, the other of said elements having a plurality of substantially wedge-shaped projections respectively located in said cutouts of said one element when said elements are in their rest position and located out of said cutouts when said elements are in their operating position; engaging means engaging said elements to prevent movement thereof with respect to each other until said one of said elements is restrained from movement while said other element continues to move; guide means cooperating with said elements for guiding the same for planar movement together in the same direction and for guiding said one element for movement in a direction normal to its plane when said projections of said other element move into or out of said cutouts; moving means operatively engaging said other element for moving the latter and said one element therewith in the same direction; stop means having a position in the path of movement of said one element for engaging and stopping the movement thereof with said other element so that said moving means then continues to move said other element to shift said elements between said rest and operating positions thereof; and a pair of electrical contact members spaced from each other when said circuit controlling elements are in their rest position, one of said contact members being located between the other of said contact members and said one circuit controlling element and in the path of movement of said one element in a direction normal to its plane to be moved by said one element into engagement with the other of said contact members when said one element moves normally to its plane during movement of said circuit controlling elements with respect to each other from said rest to said operating position thereof.

16. For use in a camera, a flash igniting device comprising, in combination, a pair of circuit control elements rotatably arranged one above the other on a common axis and having with respect to each other a rest position where an electrical circuit controlled by said elements is open and an operating position where the circuit is closed; moving means coupled to a shutter assembly of the camera and operatively engaging one of said elements for turning it about said axis; means coupling the other of said elements to said one element for turning therewith in the same direction; projecting means movable with said other element; movable stop means having a plurality of different positions in the path of movement of said projecting means and cooperating with the latter for stopping the movement of said other element at a predetermined instant depending upon the position of said stop means while said moving means continues to turn said one element for shifting said elements from said rest position to said operating position; and adjusting means for selectively adjusting said stop means to a selected one of said plurality of positions thereof in said path of movement of said projecting means.

References Cited in the file of this patent

UNITED STATES PATENTS

| | | |
|---|---|---|
| 2,186,765 | Metcalf | Jan. 9, 1940 |
| 2,298,107 | Carr | Oct. 6, 1942 |
| 2,405,741 | Fuerst | Aug. 13, 1946 |
| 2,498,277 | Kaplowitz | Feb. 21, 1950 |
| 2,541,895 | Thunberg | Feb. 13, 1951 |
| 2,555,495 | Langdon | June 5, 1951 |